US009421496B2

(12) United States Patent
Nakano et al.

(10) Patent No.: US 9,421,496 B2
(45) Date of Patent: *Aug. 23, 2016

(54) EXHAUST GAS PURIFICATION APPARATUS FOR INTERNAL COMBUSTION ENGINE

(75) Inventors: Takanori Nakano, Okazaki (JP);
Haruyuki Katayama, Susono (JP);
Tatsumi Furukubo, Susono (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 166 days.

This patent is subject to a terminal disclaimer.

(21) Appl. No.: 14/114,381

(22) PCT Filed: Apr. 28, 2011

(86) PCT No.: PCT/JP2011/060466
§ 371 (c)(1),
(2), (4) Date: Oct. 28, 2013

(87) PCT Pub. No.: WO2012/147205
PCT Pub. Date: Nov. 1, 2012

(65) Prior Publication Data
US 2014/0050628 A1 Feb. 20, 2014

(30) Foreign Application Priority Data

Apr. 28, 2011 (JP) .................. 2011-101338

(51) Int. Cl.
*B01D 53/94* (2006.01)
*B01D 53/90* (2006.01)
(Continued)

(52) U.S. Cl.
CPC ............ *B01D 53/9431* (2013.01); *B01D 53/90* (2013.01); *B01F 5/061* (2013.01);
(Continued)

(58) Field of Classification Search
USPC ..................... 422/173; 60/300, 303
See application file for complete search history.

(56) References Cited

U.S. PATENT DOCUMENTS

| 2007/0101703 A1 | 5/2007 | Kanaya et al. |
| 2008/0264042 A1 | 10/2008 | Khadiya |

(Continued)

FOREIGN PATENT DOCUMENTS

| DE | 10 2008 040 569 | 1/2010 |
| JP | 3892452 | 2/2006 |
| JP | 2006-112401 | 4/2006 |
| JP | 3892452 B2 | 3/2007 |
| JP | 2009-2213 | 1/2009 |

(Continued)

OTHER PUBLICATIONS

Office Action issued in U.S. Appl. No. 14/008,258 on Sep. 22, 2015.
Notice of Allowance issued in U.S. Appl. No. 14/008,258 on May 6, 2016.

*Primary Examiner* — Walter D Griffin
*Assistant Examiner* — Jelitza Perez
(74) *Attorney, Agent, or Firm* — Finnegan, Henderson, Farabow, Garrett & Dunner, LLP

(57) ABSTRACT

In an exhaust gas purification apparatus for an internal combustion engine which is provided with a selective reduction type catalyst disposed in an exhaust passage of the internal combustion engine, a reducing agent supply device for supplying an ammonia derived reducing agent to a portion of the exhaust passage at the upstream side of the selective reduction type catalyst, and a mixing device disposed in a portion of the exhaust passage at the upstream side of the selective reduction type catalyst and at the downstream side of the reducing agent supply device, the present invention has a problem to remove solid matter derived from the reducing agent, which is adhered to or deposited on the mixing device, in a suitable manner. In order to solve this problem, the present invention has a temperature raising device disposed in a portion of the exhaust passage upstream of said mixing device so as to blow a flame to said mixing device.

4 Claims, 5 Drawing Sheets

(51) Int. Cl.
*F01N 3/20* (2006.01)
*F01N 3/36* (2006.01)
*F01N 3/38* (2006.01)
*F01N 11/00* (2006.01)
*B01F 5/06* (2006.01)
*B01F 15/00* (2006.01)

(52) U.S. Cl.
CPC .......... *B01F15/00019* (2013.01); *F01N 3/208* (2013.01); *F01N 3/36* (2013.01); *F01N 3/38* (2013.01); *F01N 11/00* (2013.01); *B01D 2251/2062* (2013.01); *F01N 2240/14* (2013.01); *F01N 2240/20* (2013.01); *F01N 2550/05* (2013.01); *F01N 2610/02* (2013.01); *Y02T 10/24* (2013.01); *Y02T 10/47* (2013.01)

(56) References Cited

U.S. PATENT DOCUMENTS

| | | | |
|---|---|---|---|
| 2010/0071355 A1 | 3/2010 | Brown et al. | |
| 2010/0269492 A1 | 10/2010 | Kotrba et al. | |
| 2012/0151902 A1* | 6/2012 | Yi | F01N 3/2066 60/301 |

FOREIGN PATENT DOCUMENTS

| | | |
|---|---|---|
| JP | 2009-264222 | 11/2009 |
| JP | 2010-270624 | 12/2010 |
| JP | 2011-012643 | 1/2011 |
| JP | 2011-47293 | 3/2011 |
| JP | 2011-64069 | 3/2011 |

\* cited by examiner

EXHAUST GAS PURIFICATION APPARATUS FOR INTERNAL COMBUSTION ENGINE

CROSS-REFERENCE TO RELATED APPLICATIONS

This application is a national phase application of International Application No. PCT/JP2011/060466, filed Apr. 28, 2011, the content of which is incorporated herein by reference.

TECHNICAL FIELD

The present invention relates to an exhaust gas purification apparatus which is disposed in an exhaust passage of an internal combustion engine, and in particular, relates to an exhaust gas purification apparatus which serves to purify nitrogen oxides ($NO_x$) in an exhaust gas, by supplying a reducing agent derived from ammonia to a selective reduction type catalyst from an urea addition valve.

BACKGROUND ART

In a patent document 1, there is described a technique in which in an exhaust gas purification apparatus for an internal combustion engine which is provided with a selective reduction type catalyst disposed in an exhaust passage of the internal combustion engine, and an addition valve adapted to add an aqueous urea solution to an exhaust gas before flowing into the selective reduction type catalyst, provision is made for a mixing device (mixer) which is arranged in the exhaust passage eat a location upstream of the selective reduction type catalyst and downstream of the addition valve for promoting the exhaust gas and urea water to mix with each other.

In a patent document 2, there is described a technique in which in an exhaust gas purification apparatus for an internal combustion engine which is provided with a selective reduction type catalyst disposed in an exhaust passage of the internal combustion engine, and an addition valve adapted to add an aqueous urea solution to an exhaust gas before flowing into the selective reduction type catalyst, provision is made for a fin which is arranged in the exhaust passage at a location upstream of the addition valve for generating a swirl flow of the exhaust gas.

In a patent document 3, there is described an exhaust gas purification apparatus for an internal combustion engine which is provided with a catalyst carrier disposed in an exhaust passage of the internal combustion engine, an addition valve adapted to supply fuel into the exhaust passage at a location upstream of the catalyst carrier, and a glow plug adapted to ignite the fuel supplied from the addition valve.

PRIOR ART DOCUMENTS

Patent Documents

Patent Document 1: Japanese patent application laid-open No. 2009-002213
Patent Document 2: Japanese patent No. 3892452
Patent Document 3: Japanese patent application laid-open No. 2006-112401

DISCLOSURE OF THE INVENTION

Problem to be Solved by the Invention

However, according to the exhaust gas purification apparatus for an internal combustion engine as described in the above-mentioned patent document 1, urea crystals, cyanuric acid, melanin or the like may adhere to or deposit on a wall surface of the exhaust passage and the mixing device. For example, when the aqueous urea solution collides with the wall surface of the exhaust passage or the mixer, moisture will evaporate and solidify on the wall surface of the exhaust passage and in the mixer. After that, when solid matter thus formed is exposed to an atmosphere of about 200 to 400 degrees C., urea crystals, cyanuric acid and melanin will tend to be generated.

As a method of removing the solid matter adhered to or deposited on the wall surface of the exhaust passage and/or the mixer, there can be considered a method of heating the wall surface of the exhaust passage and/or the mixer by causing the temperature of the exhaust gas to go up, or a method of directly heating the exhaust passage and/or the mixer by means of a heater, etc. However, in the process in which the exhaust passage and/or the mixer are heated according to these methods, the above-mentioned solid matter may be exposed to an atmosphere of 400 degrees C. or less. Accordingly, the amounts of generation of urea crystals, cyanuric acid, melanin, etc., may be increased on the contrary.

The present invention has been made in view of the circumstances as referred to above, and has for its object to provide a technique in which in an exhaust gas purification apparatus for an internal combustion engine including a selective reduction type catalyst disposed in an exhaust passage of the internal combustion engine, a reducing agent supply device for supplying an ammonia derived reducing agent to a portion of the exhaust passage at the upstream side of the selective reduction type catalyst, and a mixing device disposed in a portion of the exhaust passage at the upstream side of the selective reduction type catalyst and at the downstream side of the reducing agent supply device, solid matter derived from the reducing agent being adhered to or deposited on the mixing device, etc., can be removed in a suitable manner.

Means for Solving the Problem

The present invention resides in an exhaust gas purification apparatus for an internal combustion engine which is provided with a selective reduction type catalyst disposed in an exhaust passage of the internal combustion engine, a reducing agent supply device for supplying an ammonia derived reducing agent to a portion of the exhaust passage at the upstream side of the selective reduction type catalyst, and a mixing device disposed in a portion of the exhaust passage at the upstream side of the selective reduction type catalyst and at the downstream side of the reducing agent supply device, wherein solid matter adhered to or deposited on the mixing device is removed without inducing the generation of urea crystals, cyanuric acid, melanin, etc., by applying a flame to the mixing device.

Specifically, an exhaust gas purification apparatus for an internal combust on engine according to the present invention is provided with:

a selective reduction type catalyst disposed in an exhaust passage of the internal combustion engine;

a reducing agent supply device to supply an ammonia derived reducing agent into a portion of the exhaust passage at the upstream side of said selective reduction type catalyst;

a mixing device disposed in a portion of the exhaust passage at the upstream side of said selective reduction type catalyst and at the downstream side of said reducing agent supply device so as to promote the reducing agent supplied from said reducing agent supply device and an exhaust gas to mix with each other; and a temperature raising device disposed in a portion of the exhaust passage at the upstream side of said mixture so as to raise the temperature of said mixing device by blowing a flame to said mixing device.

In the exhaust gas purification apparatus for an internal combustion engine as constructed in this manner, the reducing agent supplied from the reducing agent supply device flows into the selective reduction type catalyst by way of the mixing device. At that time, when the reducing agent collides with a wall surface of the mixing device, etc., solid matter derived from the reducing agent may adhere to or deposit on the mixing device. When the solid matter derived from the reducing agent is exposed to an atmosphere of about 200 to 400 degrees C. (hereinafter referred to as a "denaturation or modification atmosphere"), it will turn into difficultly melting substances. For example, in cases where an aqueous urea solution is used as the ammonia derived reducing agent, it turns into cyanuric acid, melanin, etc.

On the other hand, when the temperature raising device blows a flame to the mixing device, the solid matter adhered to or deposited on the mixing device will be exposed to an atmosphere of a sufficiently high temperature as compared with said denaturation atmosphere. At that time, the temperature of the atmosphere to which said solid matter is exposed does not gradually rise through said denaturation atmosphere, but instead goes up at a stretch to a temperature which is higher than that of said denaturation atmosphere. As a result, said solid matter comes to be melted and removed, without being denatured or modified to cyanuric acid, melanin, etc.

Accordingly, according to the exhaust gas purification apparatus for an internal combustion engine of the present invention, the solid matter derived from the reducing agent being adhered to or deposited on the mixing device can be removed in a suitable manner. Moreover, when the temperature raising device blows a flame to the mixing device, the mixing device receives the heat of the flame, so that the temperature thereof is thereby caused to go up. When the temperature of the mixing device goes up, evaporation of the reducing agent flowing into the mixing device will be promoted. In particular, in cases where the aqueous urea solution is used as the ammonia derived reducing agent, the thermal decomposition and hydrolysis of the aqueous urea solution are promoted, so that it also becomes possible to enhance the mixing effect of the exhaust gas and the reducing agent by means of the mixing device. When the mixing effect of the exhaust gas and the reducing agent by the mixing device is enhanced, it will also become possible to enhance the purification or reduction rate of nitrogen oxides ($NO_x$) in the selective reduction type catalyst.

In the exhaust gas purification apparatus for an internal combustion engine according to the present invention, the temperature raising device may be disposed in the exhaust passage at the upstream side of the reducing agent supply device. In that case, the temperature raising device may be constructed in such a manner that a flame can also be blown to a place of collision at which the reducing agent to be supplied from the reducing agent supply device collides with the wall surface of the exhaust passage, in addition to the mixing device.

When the reducing agent supplied from the reducing agent supply device collides with the wall surface of the exhaust passage, solid matter derived from the reducing agent may adhere to or deposit on said wall surface (said place of collision). When the solid matter adheres to or deposits on said place of collision, the supply of the reducing agent may be obstructed by the solid matter. On the other hand, when the temperature raising device blows a flame to said mixing device and said place of collision, the solid matter adhered to or deposited on said place of collision will be melted and removed, in addition to the solid matter adhered to or deposited on said mixing device.

Here, note that when the flame generated by the temperature raising device arrives at the reducing agent supply device, there may occur thermal deterioration of the reducing agent supply device, etc. For that reason, the reducing agent supply device may be arranged at a position at which the flame generated by said temperature raising device does not arrive. According to the above-mentioned arrangement, the solid matter adhered to or deposited on said mixing device and/or said place of collision can be removed, without accompanying the thermal deterioration of the reducing agent supply device, etc.

In the exhaust gas purification apparatus for an internal combustion engine according to the present invention, the temperature raising device may be provided with a distribution plate that serves to distribute the flame to said mixing device and said place of collision.

According to such a construction, the flame generated by the temperature raising device comes to be locally blown to said mixing device and said place of collision. As a result, said mixing device and said place of collision will be heated locally. Accordingly, it is possible to remove the solid matter derived from the reducing agent, while suppressing an amount of fuel required to generate the flame to a small level. Moreover, it also becomes possible to avoid a situation where locations other than said mixing device and said place of collision are heated unnecessarily.

Effects of the Invention

According to the present invention, in an exhaust gas purification apparatus for an internal combustion engine including a selective reduction type catalyst disposed in an exhaust passage of the internal combustion engine, a reducing agent supply device for supplying an ammonia derived reducing agent to a portion of the exhaust passage at the upstream side of the selective reduction type catalyst, and a mixing device disposed in a portion of the exhaust passage at the upstream side of the selective reduction type catalyst and at the downstream side of the reducing agent supply device, solid matter derived from the reducing agent being adhered to or deposited on the mixing device can be removed in a suitable manner.

THE BEST MODE FOR CARRYING OUT THE INVENTION

Hereinafter, specific embodiments of the present invention will be described based on the attached drawings. However, the dimensions, materials, shapes, relative arrangements and so on of component parts described in the embodiments are not intended to limit the technical scope of the present invention to these alone in particular as long as there are no specific statements.

First Embodiment

Figure 1:
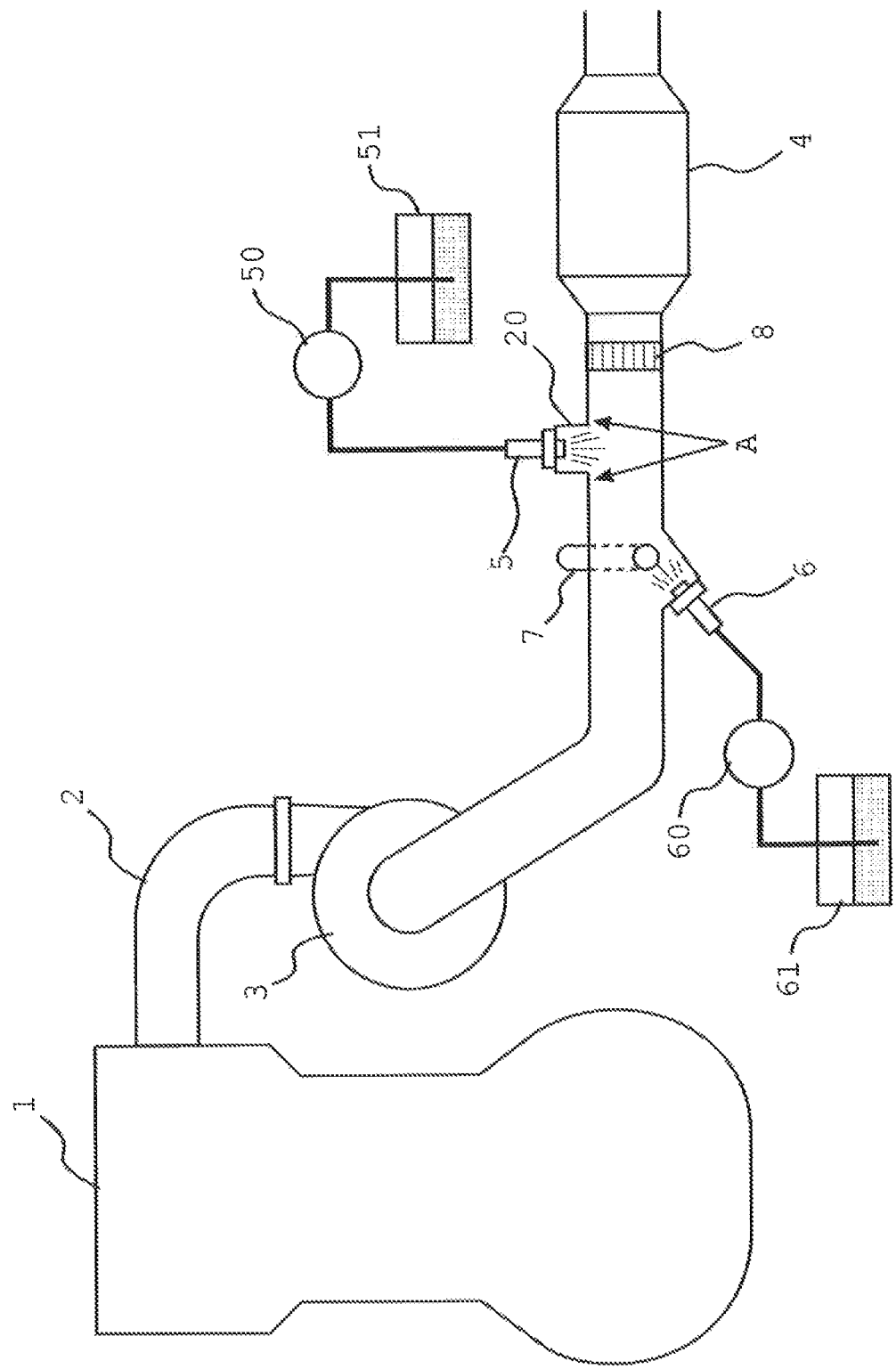
FIG. 1 is a view showing the schematic construction of an exhaust gas purification apparatus for an internal combustion engine in a first embodiment of the present invention.
Figure 2:
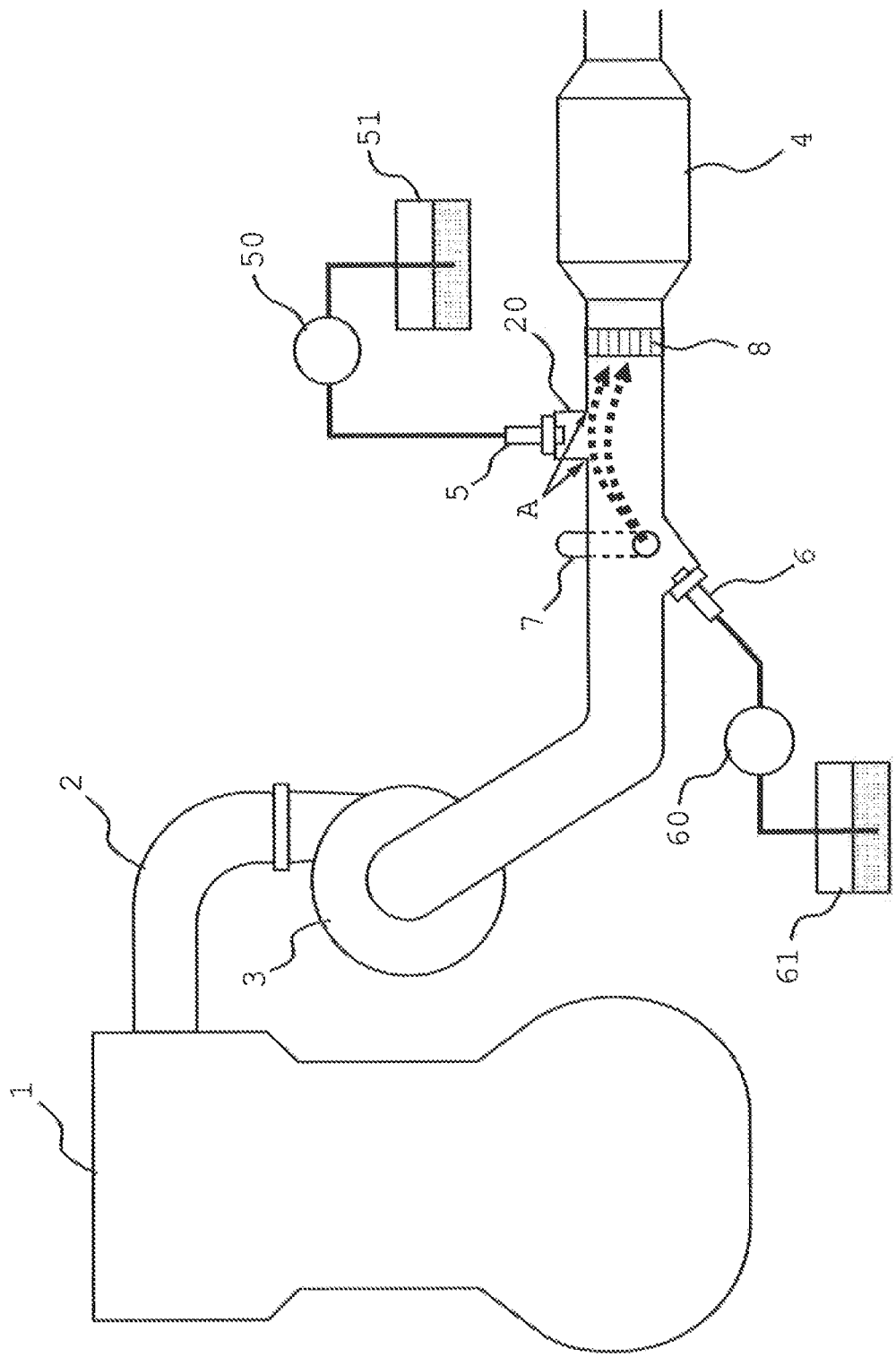
FIG. 2 is a view showing a flight path of a flame generated by a fuel addition valve and a glow plug.

First, reference will be made to a first embodiment of the present invention based on FIG. 1 through FIG. 3. FIG. 1 is a view showing the schematic construction of an exhaust system of an internal combustion engine to which the present invention is applied. An internal combustion engine 1 shown in FIG. 1 is an internal combustion engine of compression ignition type (diesel engine), but may be an internal combustion engine of spark ignition type (gasoline engine) which is able to carry out a lean combustion operation (lean burn operation).

In FIG. 1, an exhaust passage 2 is connected to the internal combustion engine 1. The exhaust passage 2 is a passage for circulating or passing a burned gas (an exhaust gas) discharged from the interior of each cylinder of the internal combustion engine 1. A turbine 3 of a centrifugal supercharger (turbocharger) is arranged in the middle of the exhaust passage 2. A catalyst casing 4 is disposed in the exhaust passage 2 at the downstream side of the turbine 3.

The catalyst casing 4 receives therein a catalyst carrier by which a selective reduction type catalyst is supported in a cylindrical casing. The catalyst carrier is formed by coating an alumina-based or zeolite-based active component (carrier) to a substrate of monolith type which has a honeycomb-shaped cross section made of heat resisting steel such as, for example, cordierite, Fe—Cr—Al steel, etc. Moreover, a precious metal catalyst (e.g., platinum (Pt)) having oxidation ability is supported by the catalyst carrier.

A reducing agent addition valve 5, a temperature raising device and a mixer 8 are mounted on a portion of the exhaust passage 2 which is located between the turbine 3 and the catalyst casing 4.

The reducing agent addition valve 5 is disposed in the exhaust passage 2 at the upstream side of the catalyst casing 4, in a portion (depressed portion) 20 of the exhaust passage 2 which is depressed to a radially outer side thereof, in such a manner that the reducing agent addition valve 5 is not exposed or protruded into the exhaust passage 2. In addition, the reducing agent addition valve 5 is connected to a reducing agent tank 51 through a first pump 50. The first pump 50 draws the reducing agent stored in the reducing agent tank 51, and at the same time, pressure feeds the reducing agent thus drawn to the reducing agent addition valve 5. The reducing agent addition valve 5 injects the reducing agent pressure fed from the first pump 50 into the exhaust passage 2. The reducing agent addition valve 5, the first pump 50 and the reducing agent tank 51 are one form of embodiment of a reducing agent supply device according to the present invention.

Here, note that the reducing agent stored in the reducing agent tank 51 is an ammonia derived reducing agent. As the ammonia derived reducing agent, there can be used a water solution of urea, ammonium carbamate, or the like. In this embodiment, it is assumed that an aqueous urea solution is used as the ammonia derived reducing agent.

The mixer 8 is a device which is disposed in a portion of the exhaust passage 2 at the downstream side of the reducing agent addition valve 5 and at the upstream side of the catalyst casing 4, and which serves to promote the reducing agent added from the reducing agent addition valve 5 and the exhaust gas to mix with each other. For example, the mixer 8 is constructed in such a manner that the exhaust gas and the reducing agent, are agitated by gene-rating a swirl stream of the exhaust gas, or by generating a turbulence in the flow of the exhaust gas.

Here, when the aqueous urea solution is injected from the reducing agent addition valve 5, the aqueous urea solution flows into the mixer 8 together with the exhaust gas. The mixer 8 acts to agitate the aqueous urea solution and the exhaust gas. As a result, the aqueous urea solution and the exhaust gas are mixed with each other in a homogeneous manner, and at the same time, the aqueous urea solution is pyrolyzed or hydrolyzed by receiving the heat of the exhaust gas. When the aqueous urea solution is pyrolyzed or hydrolyzed, ammonia ($NH_3$) is generated. Accordingly, the gas flowing out of the mixer S becomes a gas in which the exhaust gas and ammonia ($NH_3$) have been mixed in a homogeneous manner. When such a gas flows into the catalyst casing 4, ammonia ($NH_3$) comes to spread around substantially the whole of the catalyst casing 4. The ammonia ($NH_3$) having flowed into the catalyst casing 4 is adsorbed or occluded by the selective reduction type catalyst. The ammonia ($NH_3$) adsorbed or occluded by the selective reduction type catalyst reacts with the nitrogen oxides ($NO_x$) contained in the exhaust gas to generate nitrogen ($N_2$) and water ($H_2O$). That is, the ammonia ($NH_3$) functions as a reducing agent for the nitrogen oxides ($NO_x$). At that time, in cases where the ammonia ($NH_3$) has been adsorbed in a wide range of the selective reduction type catalyst, it is possible to enhance the purification or reduction rate of the nitrogen oxides ($NO_x$) in the selective reduction type catalyst.

The temperature raising device is a device which acts to blow a flame onto those parts (i.e., a wall surface of the exhaust passage 2 or the mixer 8) which solid matter derived from the reducing agent added from the reducing agent addition valve 5 tends to adhere to or deposit on, thereby rapidly raising the temperature of the parts. The temperature raising device is provided with a fuel addition valve 6 and a glow plug 7.

The fuel addition valve 6 is disposed in a portion of the exhaust passage 2 at the upstream side of the reducing agent addition valve 5. The fuel addition valve 6 is connected to a fuel tank 61 through a second pump 60. The fuel tank 61 is a tank which serves to store fuel for the internal combustion engine 1. The second pump 60 draws the fuel stored in the fuel tank 61, and at the same time, pressure feeds the fuel thus drawn to the fuel addition valve 6. The fuel addition valve 6 injects the fuel sent from the second pump 60 into the exhaust gas in the exhaust passage 2.

The glow plug 7 is disposed in such a manner that a heat generation portion of the glow plug 7 is located in the vicinity of a nozzle hole of the fuel addition valve 6, or on the flight path of the fuel injected from the fuel addition valve 6. The glow plug 7 is to cause the heat generation portion to generate heat by converting the electrical energy supplied from an unillustrated battery or alternator into thermal or heat energy. The glow plug 7 acts to ignite or fire fuel by causing the heat generation portion to generate heat at the time when the fuel is injected from the fuel addition valve 6.

Here, when the reducing agent (aqueous urea solution) injected from the reducing agent addition valve 5 collides with the mixer 8, the wall surface of the exhaust passage 2, etc., solid matter is precipitated in those parts. When such solid matter is exposed to an atmosphere of about 200 to 400 degrees C. (denaturation or modification atmosphere), it will turn into difficultly melting substances such as cyanuric acid, melanin, and so on. For that reason, there has been a fear that when the solid matter is intended to be melted and removed by raising the temperature of the exhaust gas or by being heated by means of a heater, the solid matter is exposed to a denaturation atmosphere in the temperature raising process or the heating process, thereby promoting generation of cyanuric acid, melanin, etc.

On the other hand, when the temperature raising device blows a flame to the above-mentioned parts, the solid matter will be exposed to an atmosphere which is sufficiently higher in temperature than the denaturation atmosphere. Moreover, the temperature of the atmosphere to which the solid matter is exposed does not gradually rise through the denaturation atmosphere, but instead goes up at a stretch to a temperature which is higher than that of the denaturation atmosphere. As a result, the solid matter is melted and removed, without being denatured or modified to cyanuric acid, melanin, etc.

Accordingly, if the amount of fuel added by the fuel addition valve 6 and the amount of heat generated by the glow plug 7, which together constitute the temperature raising device, are controlled so as to cause a proper amount of flame to arrive at the above-mentioned parts, the parts will receive the heat of the flame thereby to rapidly rise in temperature, so that the solid matter will be melted and removed. Here, note that in the example shown in FIG. 1, the solid matter derived from the reducing agent is easy to adhere to or deposit on the mixer 8 and a branching portion (a part indicated by an arrow A in FIG. 1) between the exhaust passage 2 and the depressed portion 20. Accordingly, in order to melt and remove the solid matter adhered to or deposited on the branching portion A and the mixer 8 in a more reliable manner, the temperature raising device and the mixer 8 may be arranged in such a manner that a flame (which is indicated by arrows of broken lines in FIG. 2) generated by the fuel addition valve 6 and the glow plug 7 arrives to the mixer 8 by way or the branching portion A, as shown in FIG. 2.

Specifically, the fuel addition valve 6 may be composed of an injector of low diffusion type with which the fuel added thereby does not diffuse easily, and may be arranged in such a manner that the nozzle hole of the injector is directed to the branching portion A, and at the same time, the direction thereof is inclined with respect to an axis of the exhaust passage 2. At that time, the glow plug 7 should just be arranged on the flight path of the fuel added from the fuel addition valve 6. According to such arrangements, the fuel injected from the fuel addition valve 6 is reflected on the wall surface of the exhaust passage 2 in the vicinity of the branching portion A, so that it comes to arrive to the mixer 8. According to this, the flame generated by the glow plug 7 comes to be blown to the mixer 8 by way of the branching portion A.

Accordingly, the solid matter derived from the reducing agent adhered to or deposited on the wall surface of the exhaust passage 2 and/or the mixer 8 can be removed, without being turned into substances which are difficult to melt. Here, note that the temperature raising device can blow a flame onto the branching portion A and the mixer 8 in a local manner, so that the temperatures of the branching portion A and the mixer 8 can be caused to rise rapidly, while suppressing an increase in the fuel consumption. In addition, because the fuel addition valve 6 and the glow plug 7 can be caused to operate without regard to the operating state of the internal combustion engine 1, it becomes possible to remove the solid matter derived from the reducing agent, before the amount of adhesion or the amount of deposit thereof becomes excessively large, or it also becomes possible to prohibit the operations of the fuel addition valve 6 and the glow plug 7 when the amount of adhesion or the amount of deposit of the solid matter derived from the reducing agent is exceptionally small. Moreover, when the temperature raising device blows a flame to the mixer 8, the temperature of the mixer 8 and the ambient temperature inside the mixer 8 are made higher. For that reason, evaporation of the aqueous urea solution flowing into the mixer 8 is promoted, and at the same time, thermal decomposition and hydrolysis of urea therein are also promoted. As a result, it is possible to suppress a situation in which the aqueous urea solution flows into the catalyst casing 4 as it is in a liquid phase, and at the same time, it also becomes possible to make the ammonia ($NH_3$) and the exhaust gas much more uniform.

Incidentally, when the flame generated by the temperature raising device strikes against the reducing agent addition valve 5, there may be caused adverse or harmful effects such as thermal deterioration of the reducing agent addition valve 5, etc. However, because the reducing agent addition valve 5 of this embodiment is arranged in the depressed portion 20 of the exhaust passage 2 which is depressed or recessed to the radially outer side of the exhaust passage 2, it is possible to avoid the situation where the flame strikes against the reducing agent addition valve 5. Accordingly, the solid matter derived from the reducing agent can be removed, without accompanying the thermal deterioration of the reducing agent addition valve 5, etc. Here, note that as another construction which serves not to expose the reducing agent addition valve 5 to the flame, there can also be adopted one in which a shield plate or the like is disposed at the immediately upstream side of the reducing agent addition valve 5.

Figure 3:
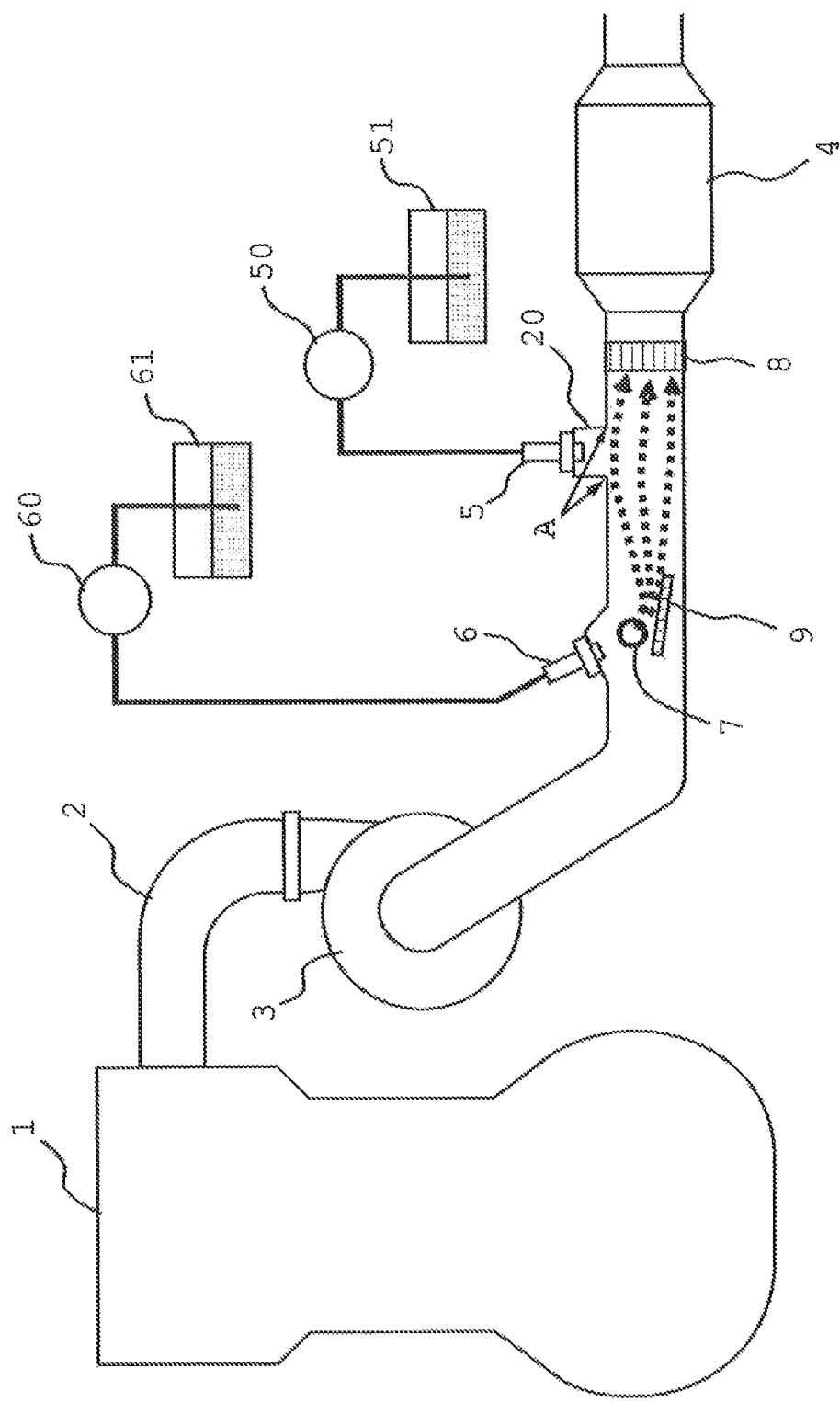
FIG. 3 is a view showing another construction example of the exhaust gas purification apparatus for an internal combustion engine in the first embodiment of the present invention.

In addition, the temperature raising device may be provided with a distribution plate 9 which is disposed on the flight path of the fuel added from the fuel addition valve 6, as shown in FIG. 3. It is preferable that the distribution plate 9 be constructed in such a manner that the fuel or flame having collided with the distribution plate 9 goes to a downstream side, while diffusing in a radial direction within the exhaust passage 2. According to such a construction, it is possible to cause the flame to arrive to the branching portion A, and at the same time, it is also possible to cause the flame to arrive at substantially the entire region of an upstream side end face of the mixer 8. As a result, the solid matter derived from the reducing agent being adhered to or deposited on the mixer 8 can be removed in a more reliable manner, and at the same time, the evaporation of the aqueous urea solution in the mixer 8 as well as the thermal decomposition and hydrolysis of urea can be promoted further more.

Second Embodiment

Next, reference will be made to a second embodiment of the present invention based on FIG. 4 and FIG. 5. Here, a construction different from that of the above-mentioned first embodiment will be described, and an explanation of the same construction will be omitted.

The difference between the above-mentioned first embodiment and this second embodiment resides in the feature that the solid matter derived from the reducing agent is removed by using a temperature raising device for raising the temperature of the catalyst.

Figure 4:
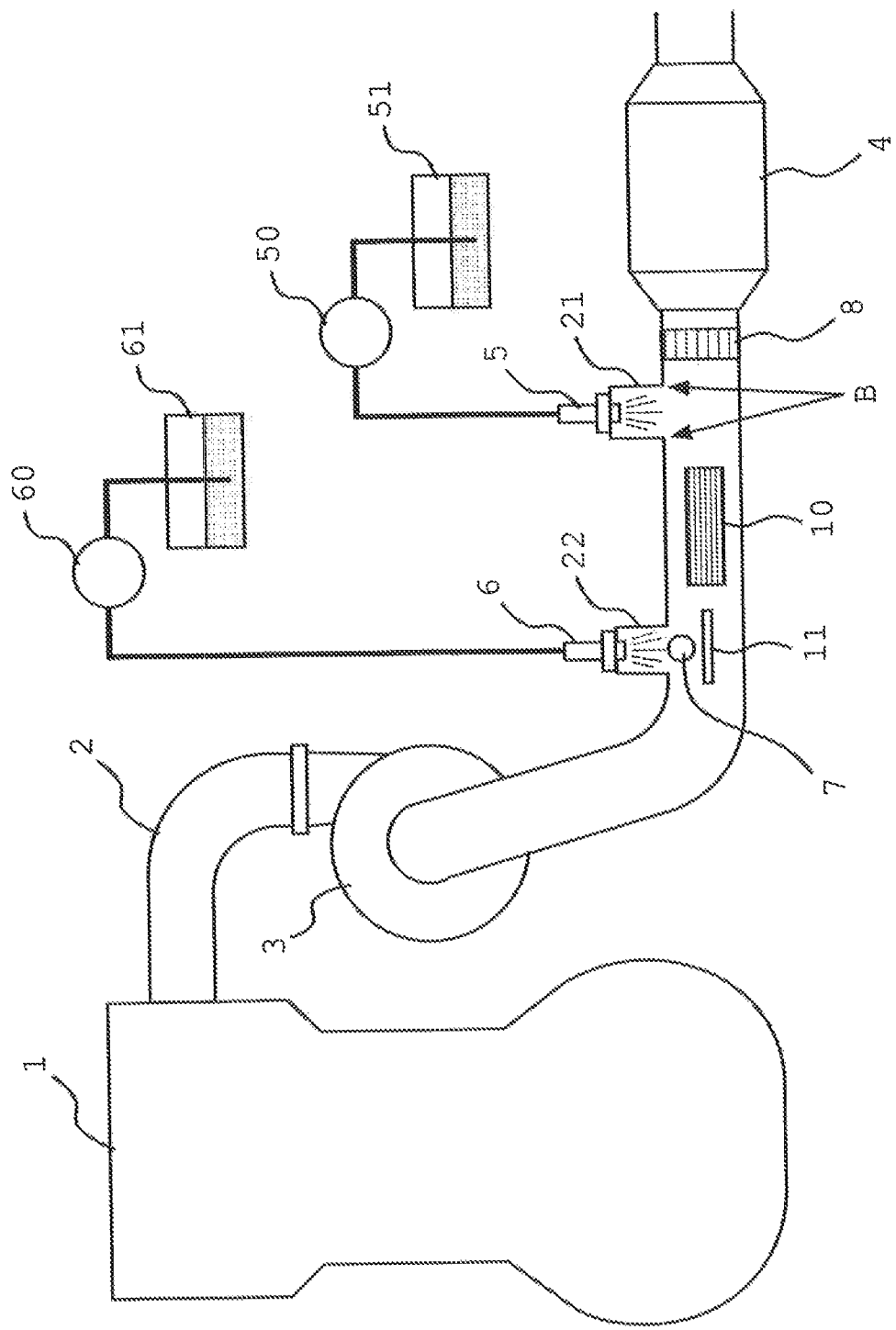
FIG. 4 is a view showing the schematic construction of an exhaust system of an internal combustion engine in a second embodiment of the present invention.
Figure 5:
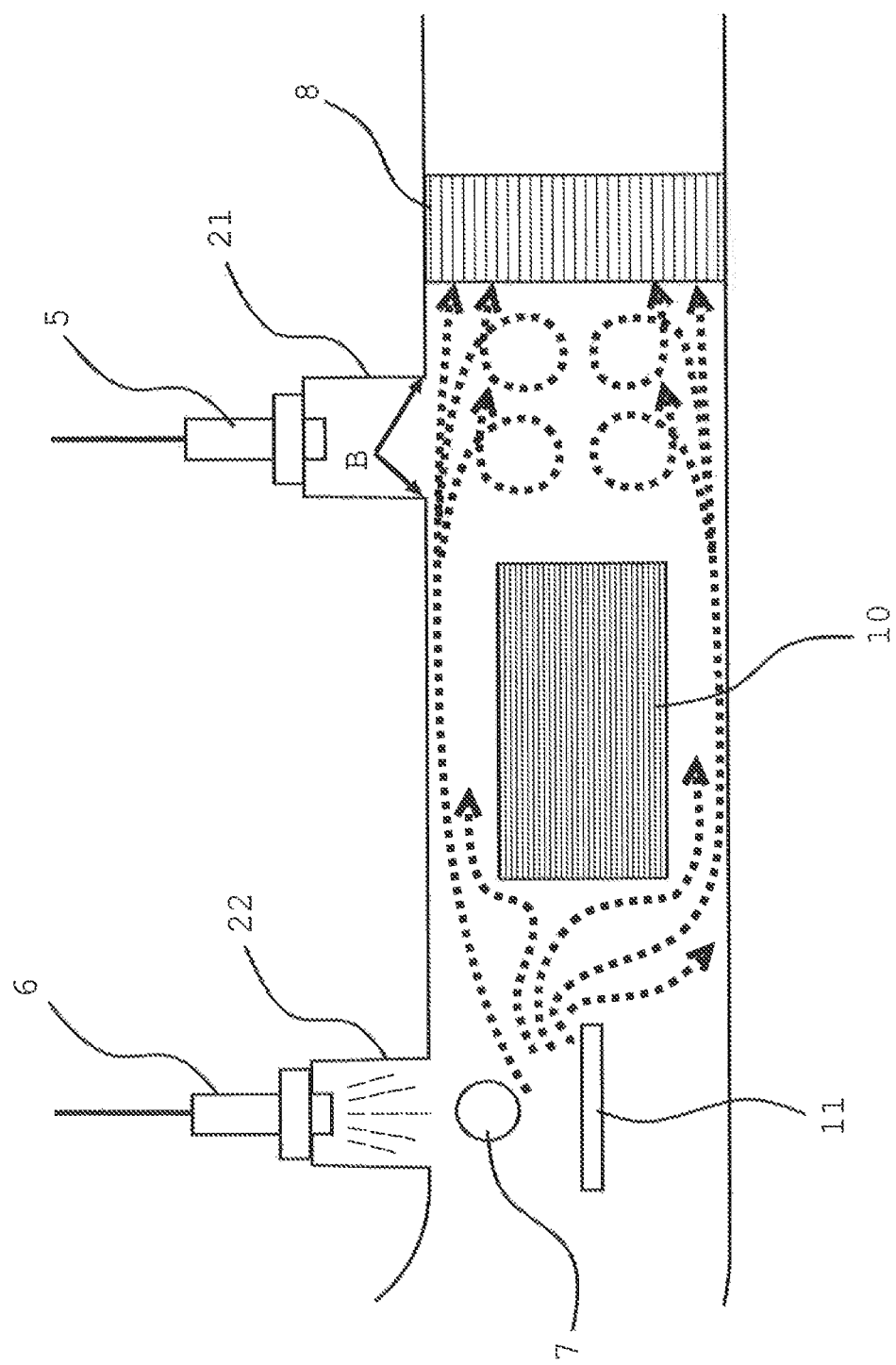
FIG. 5 is a view showing a flight path of a flame generated by a fuel addition valve and a glow plug.

FIG. 4 is a view showing the schematic construction of an exhaust system of an internal combustion engine 1 according to this second embodiment of the present invention. In FIG. 4, the same symbols are attached to the same components as those in the above-mentioned first embodiment. In FIG. 4, a particulate filter 10 having an oxidation catalyst supported thereon is disposed in a portion of an exhaust passage 2 at the downstream side of a fuel addition valve 6 and a glow plug 7, and at the upstream side of a reducing agent addition valve 5.

The particulate filter 10 is formed in a cylindrical shape having an outside diameter smaller than an inside diameter of the exhaust passage 2, and is arranged in coaxial relation with the exhaust passage 2. Here, note that in place of the particulate filter 10, a catalyst carrier of a cylindrical shape may be arranged, and an oxidation catalyst may be supported by the catalyst carrier.

In addition, the reducing agent addition valve 5 of this embodiment is disposed in a straight portion of the exhaust passage 2, in a depressed portion 21 of the exhaust passage 2 which is depressed to a radially outer side thereof, in such a manner that the reducing agent addition valve 5 is not exposed or protruded into the exhaust passage 2. On the other hand, the fuel addition valve 6 of the temperature raising device disposed in the straight portion of the exhaust passage 2, in a depressed portion 22 of the exhaust passage 2 which is depressed to a radially outer side thereof, in such a manner that the fuel addition valve 6 is not exposed or protruded into the exhaust passage 2. The glow plug 7 of the temperature raising device is disposed in such a manner that a heat generation portion of the glow plug 7 is located in the vicinity of a nozzle hole of the fuel addition valve 6, or on the flight path of the fuel injected from the fuel addition valve 6, similarly to the above-mentioned first embodiment.

In the exhaust gas purification apparatus for an internal combustion engine as constructed in this manner, in cases where particulate matter trapped by the particulate filter 10 is to be oxidized, or in cases where the catalyst supported on the particulate filter 10 is to be activated, etc., when the fuel addition valve 6 and the glow plug 7 are caused to operate, a flame generated by the fuel addition valve 6 and the glow plug 7 will arrive at the vicinity of the particulate filter 10 by receiving the pressure of the exhaust gas. In that case, the temperature of the particulate filter 10 and the temperature of the exhaust gas flowing into the particulate filter 10 will go up quickly. As a result, the particulate matter trapped by the particulate filter 10 will, be oxidized, or the oxidation catalyst supported on the particulate filter 10 will be activated quickly.

However, when the reducing agent injected from the reducing agent addition valve 5 collides with the wall surface of the exhaust passage 2, solid matter derived from the reducing agent is precipitated on the wall surface. In the example shown in FIG. 4, the solid matter derived from the reducing agent is easy to adhere to or deposit on a stepped portion (a part indicated by an arrow B in FIG. 4) in a boundary between the depressed portion 21 and the exhaust passage 2.

Accordingly, the temperature raising device of this embodiment is provided with a distribution plate 11 which serves to distribute the flame generated by the fuel addition valve 6 and the glow plug 7 to the particulate filter 10, the stepped portion B and the mixer 8. The distribution plate 11 is disposed at a location downstream of the heat generation portion of the glow plug 7 on the flight path of the fuel injected from the fuel addition valve 6. At that time, the distribution plate 11 should be disposed in such a manner that the fuel or the flame having collided with the distribution plate 11 can arrive to the mixer 8 while passing through a gap between the particulate filter 10 and the exhaust passage 2.

For example, in the example shown in FIG. 4, the fuel added from the fuel addition valve 6 flies to the radially inner side of the exhaust passage 2, and hence, the distribution plate 11 is disposed substantially in parallel with an axial direction of the exhaust passage 2. Thus, when the distribution plate 11 is arranged in this manner, as shown in FIG. 5, the flame (flame indicated by an arrow of a broken line in FIG. 5) generated by the fuel addition valve 6 and the glow plug 7 collides with the distribution plate 11, and thereafter is dispersed in a radial direction of the exhaust passage 2.

A portion of the flame dispersed to the vicinity of the periphery of the exhaust passage 2 flows into the gap between the particulate filter 10 and the exhaust passage 2. In addition, a portion of the flame dispersed to the vicinity of the center of the exhaust passage 2 collides with an upstream side end face of the particulate filter 10, and thereafter flows into the gap between the particulate filter 10 and the exhaust passage 2. The flame having flowed into the gap between the particulate filter 10 and the exhaust passage 2 goes in the axial direction of the exhaust passage 2. Subsequently, when the flame arrives downstream of a downstream side end face of the particulate filter 10, a part of the flame advances along a peripheral edge portion of the exhaust passage 2 in the axial direction thereof, and the remaining flame advances to a downstream side of the exhaust passage 2, while diffusing to a radially inner side of the exhaust passage 2. In other words, the flame will arrive at the mixer 8, while spreading in the radial direction in the downstream of the downstream side end face of the particulate filter 10.

Accordingly, the flame generated by the fuel addition valve 6 and the glow plug 7 will be distributed to the particulate filter 10, the stepped portion B and the mixer 8. As a result, the solid matter adhered to or deposited on the stepped portion B and/or the mixer 8 is removed, without denaturing to difficultly melting substances such as cyanuric acid, melanin, and so on.

In addition, when the flame collides with the upstream side end face of the particulate filter 10, or when the flame passes through the gap between the particulate filter 10 and the exhaust passage 2, the heat of the flame is conducted to an outer peripheral surface of the particulate filter 10, so it also becomes possible to cause the temperature of the particulate filter 10 to go up quickly.

Moreover, in the downstream of the downstream side end face of the particulate filter 10, the flame arrives at the mixer 8 while spreading in the radial direction, so that it can be caused to arrive at substantially the entire region of the upstream side end face of the mixer 8. As a result, the solid matter derived from the reducing agent being adhered to or deposited on the mixer 8 can be removed in a more reliable manner, and at the same time, the evaporation of the aqueous urea solution in the mixer 8 as well as the thermal decomposition and hydrolysis of urea can be promoted further more.

According to the second embodiment described above, a temperature raising device for raising the temperature of the particulate filter 10 and a temperature raising device for removing solid matter derived from a reducing agent can be shared. As a result, it becomes possible to remove the solid matter derived from the reducing agent in a suitable manner, while suppressing an increase in the number of component parts.

DESCRIPTION OF THE REFERENCE NUMERALS AND SYMBOLS 1 internal combustion engine
2 exhaust passage
3 turbine
4 catalyst casing
5 reducing agent addition valve
6 fuel addition valve
7 glow plug
8 mixer (mixing device)
9 distribution plate
10 particulate filter 11 distribution plate
50 first pump
51 reducing agent tank
60 second pump
61 fuel tank

The invention claimed is:

1. An exhaust gas purification apparatus of an internal combustion engine comprising:
   a selective reduction type catalyst disposed in an exhaust passage of the internal combustion engine;
   a reducing agent supply device to supply an ammonia derived reducing agent into a portion of the exhaust passage at the upstream side of said selective reduction type catalyst;
   a mixing device disposed in a portion of the exhaust passage at the upstream side of said selective reduction type catalyst and at the downstream side of said reducing agent supply device so as to promote the reducing agent to be supplied from said reducing agent supply device and an exhaust gas to mix with each other; and
   a temperature raising device disposed in a portion of the exhaust passage at the upstream side of said reducing agent supply device so as to raise the temperature of said mixing device by blowing a flame to said mixing device, said temperature raising device being configured to blow the flame to a place of collision at which the reducing agent to be supplied from said reducing agent supply device collides with a wall surface of the exhaust passage, as well as to said mixing device.

2. The exhaust gas purification apparatus for an internal combustion engine according to claim 1, wherein said reducing agent supply device is disposed at a position at which the flame generated by said temperature raising device does not arrive.

3. The exhaust gas purification apparatus for an internal combustion engine according to claim 1, wherein said temperature raising device is provided with a distribution plate that serves to distribute the flame to said place of collision and said mixing device.

4. The exhaust gas purification apparatus for an internal combustion engine according to claim 2, wherein said temperature raising device is provided with a distribution plate that serves to distribute the flame to said place of collision and said mixing device.

* * * * *